United States Patent [19]
Ackerman

[11] Patent Number: 5,387,340
[45] Date of Patent: Feb. 7, 1995

[54] WIRE FILTER ELEMENT AND METHOD OF MANUFACTURE

[76] Inventor: Carl D. Ackerman, 1160 Woodhill Dr., Gibsonia, Pa. 15044

[21] Appl. No.: 91,284

[22] Filed: Jul. 15, 1993

[51] Int. Cl.⁶ .................... B01D 29/48; B01D 29/54
[52] U.S. Cl. .................... 210/497.01; 210/498; 210/499; 29/163.7; 29/163.8
[58] Field of Search .............. 29/163.6, 163.7, 163.8; 210/497.1, 498, 499, 497.01

[56] References Cited

U.S. PATENT DOCUMENTS

| | | | |
|---|---|---|---|
| 3,640,760 | 2/1972 | Nichols, Jr. | 210/499 |
| 4,456,531 | 6/1984 | Kubota et al. | 210/499 |
| 4,921,599 | 5/1990 | Botsch | 210/499 |
| 5,047,148 | 9/1991 | Arai | 210/498 |
| 5,064,536 | 11/1991 | Bratten | 29/163.8 |

FOREIGN PATENT DOCUMENTS 608959  2/1935  Germany ............. 210/497.1

*Primary Examiner*—Robert A. Dawson
*Assistant Examiner*—W. L. Walker
*Attorney, Agent, or Firm*—Paul Bogdon

[57] ABSTRACT

A wire filter element having slit openings of between 0.5 and 100 microns, and a method of manufacturing the filter element are disclosed. The filter element includes a plurality of generally parallel spaced elongated filter wire members having a trapezoidal cross-sectional shape, or rectangular cross-sectional shape separating pairs of trapezoidal shaped filter wires. Laterally extending support bars secure the filter wire in place. Ridges are formed on one side of the trapezoidal filter wires and on both sides of the rectangular filter wires. The ridges have lateral dimensions the same as the desired slit openings between adjacent filter wires. The filter wires are secured in place with the ridges engaging the upper side portions of adjacent filter wires. The ridges may be permanently fixed with the filter wires or removable after the filter wires are secured in place to define the slit openings.

11 Claims, 3 Drawing Sheets

WIRE FILTER ELEMENT AND METHOD OF MANUFACTURE

BACKGROUND OF THE INVENTION

This invention relates to a novel wire filter element with mechanically controlled filter slits of precise minute openings in the range of 0.5 to 100 microns, and to a method of manufacturing the novel wire filter element.

Filter elements consisting of trapezoidal shaped wire elements are used in various processes to separate fibrous and coarse material from finer solids and liquids. Typical of such uses are paper pulp separation, water well screens, water treatments, and others. There are other processes which use finely divided catalysts to promote reactions in vessels typically operated at elevated temperatures and pressure where it is economically desirable to use the catalysts for prolonged periods without shutting down the process or without losing or replacing the catalyst. Some of the existing processes retain the catalyst in the reactor, or control the loss to a small amount each day by use of cyclones, filters, electrostatic precipitators, or scrubbers. At times these methods are satisfactory and at other times not. In certain processes the catalyst particle diameters used typically fall in the range of 0.5 to 100 microns. There has been a rapidly increasing use of Slurry Bubble Column Reactors using the very fine sized catalysts in which catalyst retention has been an unsolved problem. This was the conclusion of B. Bhatt et al in their paper entitled "Liquid-Phase Fischer-Tropsch Synthesis in a Bubble Column," published by the U.S. Department of Energy Pittsburgh Technology Center in the compilation "Liquefactions Proceedings", Sep. 22–24, 1992. As stated in the paper: "No single proven technology exists in the public domain" to retain the catalyst.

In tests and other experience with fine particle retention, the tendency of porous metal, fine-wire matts and other designs to rapidly and often permanently plug has been often demonstrated. The shaped-wire screens or filters have a greatly reduced tendency for plugging. However, they have not yet been made with openings fine enough to retain catalysts of the size typically used in Slurry Bubble Column Reactors, or similar applications.

Various attempts have been unsuccessfully made to limit filter slit widths to a precise minute dimension of about 20 microns. Korchi Arai in his U.S. Pat. No. 5,047,148 for "Retained Wire Filter Element" represents the forming of filtering slits with an accuracy of one micron to one millimeter by anchoring a specially shaped wire into matching grooves in a plate. The distance between the grooves in the plate, minus the width of the top surface of the specially shaped wire would determine the filtering slit width with the accuracy claimed. Since the filtering slit width in the Arai technique is subject to the sum of at least two machining tolerances, it appears unlikely that a slit width accuracy represented by Arai can be attained.

Fritted metal and fine-wire screens have been made with openings averaging as small as a few microns. However, it has been found that such filters display wide variances in the size of the space inside the relatively deep structure of the filter medium. The result is that fine particles infiltrate and are trapped inside the structure resulting in plugging and blinding.

This invention overcomes the limitations in heretofore known filter elements having filtering slits of precise minute widths by providing a filtering element and method of manufacturing the element with controlled openings or filtering slits with widths in the range of 0.5 to 100 microns. Thus, this invention will permit the retention of catalysts or solids of fine sizes and at the same time achieve the filtering advantages of shaped wire filtering elements. Such filters and their use would enable long operating periods such as a year or more, with catalyst losses confined largely to the fines generated by attrition. The first application of filters embodying my invention in a given process and set of circumstances could use double filters with blowback provision for insurance against temporary plugging from process upsets. Other uses of the filter element of my present invention would include: cross-flow filtration; fluidized bed reactions; other gas-liquid-solids reactions; solid catalyzed liquid-liquid reactions; gas sparging or distribution in beds with fine solids; and instrument connections into beds with fine solids.

SUMMARY OF THE INVENTION

This invention provides a filter element and method of manufacturing the same filter element, which filter element preferably comprises: a plurality of generally parallel spaced elongated filter wire members each having a definite cross-sectional shape, such as a trapezoidal shape, and defining filtering slits therebetween; support means engaging the filter wire members for securing the filter wire members in place; certain of the filter wire members having on at least one side surface thereof a plurality of spaced ridges each of a predetermined lateral dimension equivalent to the desired filtering slit opening dimension; and the filter wire members being secured in place with the ridges in engagement with at least the upper side surface of an adjacent filter wire member. In one embodiment of the invention all of the filter wire members have a trapezoidal shape with each having spaced ridges formed on one side and the opposite side being smooth. The ridges and therefore the filtering slit openings may be sized anywhere between 0.5 and 100 microns. Another embodiment of this invention has trapezoidal filter wire members without any ridges, separated by filter wire members of rectangular cross-sectional shape having spaced ridges formed on both side surfaces and in engagement with the upper side surfaces of adjacent trapezoidal filter wire members. The ridges may be integral with the filter wire members or removable. Removable ridges could also be in the form of a coating which could be dissolved in a suitable solvent after the filter element is formed with the desired filtering slit openings.

The method of manufacturing the filter element of this invention is characterized by the preferred steps of: forming laterally extending ridges on at least one side surface of a filter wire member having a definite cross-sectional shape, the ridges having a lateral dimension substantially the same as the desired opening of filtering slits between adjacent filter wire members; and securing a plurality of the filter wire members such that the ridges engage at least the upper surface portions of side of the adjacent filter wire member. The method of manufacturing may include the additional step of removing the ridges, which could be in the form of a coating of soluble material, after the filter wire members are secured in place whereby the desired filtering slit openings remain as originally formed.

Various other advantages, details, and modifications of the present invention will become apparent as the following description of certain present preferred embodiments and preferred methods of manufacture proceed.

DESCRIPTION OF THE DRAWINGS

In the accompanying drawings I show certain present preferred embodiments of my invention in which.

DESCRIPTION OF PREFERRED EMBODIMENTS

Figure 1:
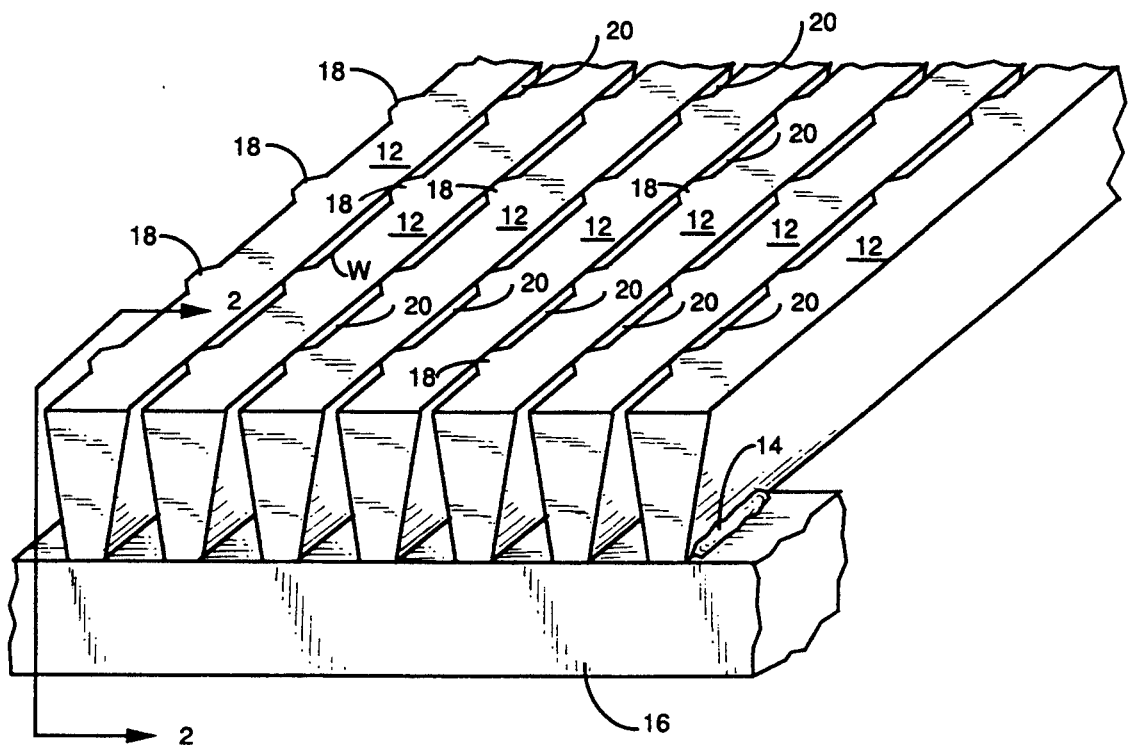
FIG. 1 is an exploded perspective view of part of a filter element which in overall shape may be cylindrical, flat, multisided, or other shapes, showing trapezoidal shaped filter wire elements and embodying one form of my present invention.
Figure 2:
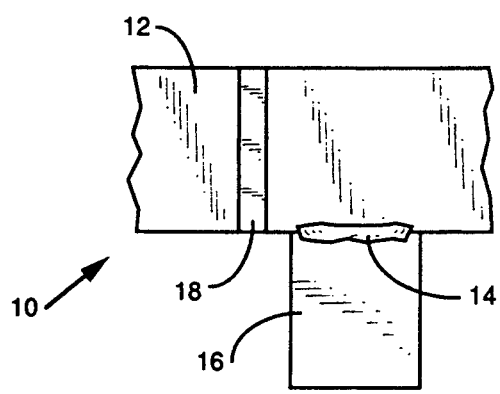
FIG. 2 is a side elevation view looking along the line 2—2 of FIG. 1 of part of one filter wire element and the support element of FIG. 1, showing the ridges extending over the entire side surface of the filter wire member.
Figure 4:
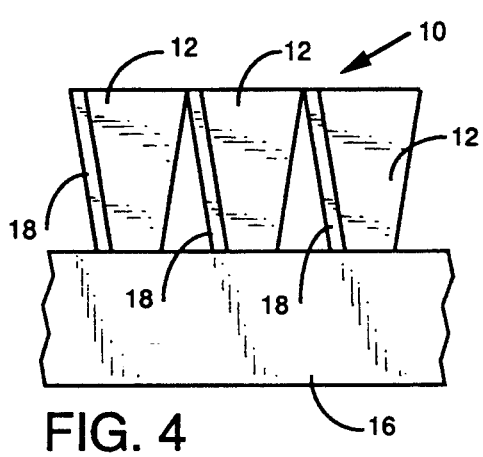
FIG. 4 is a partial front elevation view of three of the filter wire members and support element of the filter element of FIG. 1 showing the ridges in engagement with the upper surface portions of adjacent filter wire members and further showing the ridges extending over the entire side surface of the filter wire members.

Referring now to the drawings, FIGS. 1–4 illustrate part of a wire filter element 10 which, as well known in the art, could have an overall cylindrical, flat, multisided, or other shape, and which is useable in various processes to separate fibrous and coarse material from finer solids and liquids. Filter wire members 12 of a suitable material and having a well known trapezoidal cross-sectional shape are secured as by spot welding 14 to a standard support element 16. Integrally formed on one of the side surfaces of each filter wire member 12 are a plurality of identically sized and shaped, laterally extending longitudinally shaped ridges 18. Each ridge 18 is formed with a lateral dimension the same as that of the desired filter slit opening 20 between adjacent filter wire members 12. The ridges 18 extend along the entire side length of the filter wire members 12, and engage the upper surface portions of the adjacent filter wire members 12, to thereby serve to define the filter slit openings 20. The filter wire members 12 are secured to the support element 16 such that the upper portions of ridges 18 firmly engage the upper surface portions of adjacent filter wire members 12. The sides of the filter wire members 12 engaged by the ridges 18 are continuous, smooth, and without any ridges or the like formed on them. The ridges 18, and therefore the filter slit openings 20, are capable of being formed at precise minute lateral dimensions such as between 0.5 and 100 microns.

Figure 5:
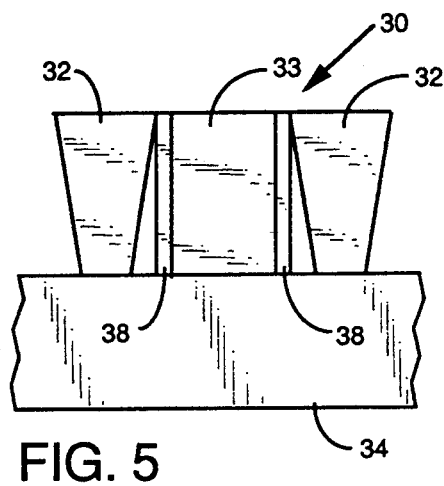
FIG. 5 is a partial front elevation view of a filter element similar to that of the filter element of FIGS. 1–4, embodying another form of my present invention, and showing trapezoidal shaped filter wire members separated by a rectangular shaped filter wire member having ridges formed on both side surfaces.
Figure 3:
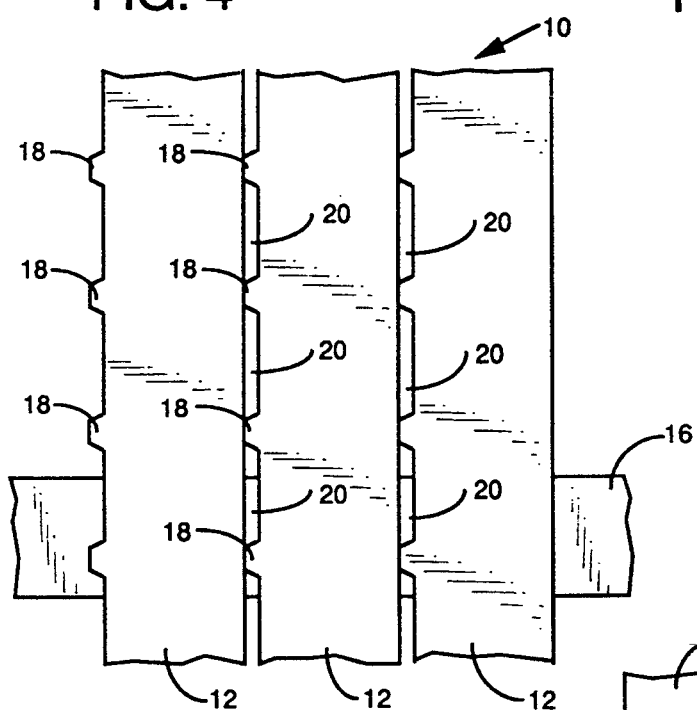
FIG. 3 is a partial plan view of the filter element of FIG. 1 showing the ridges of the filter wire members in engagement with the upper surface portions of adjacent filter wire members.
Figure 6:
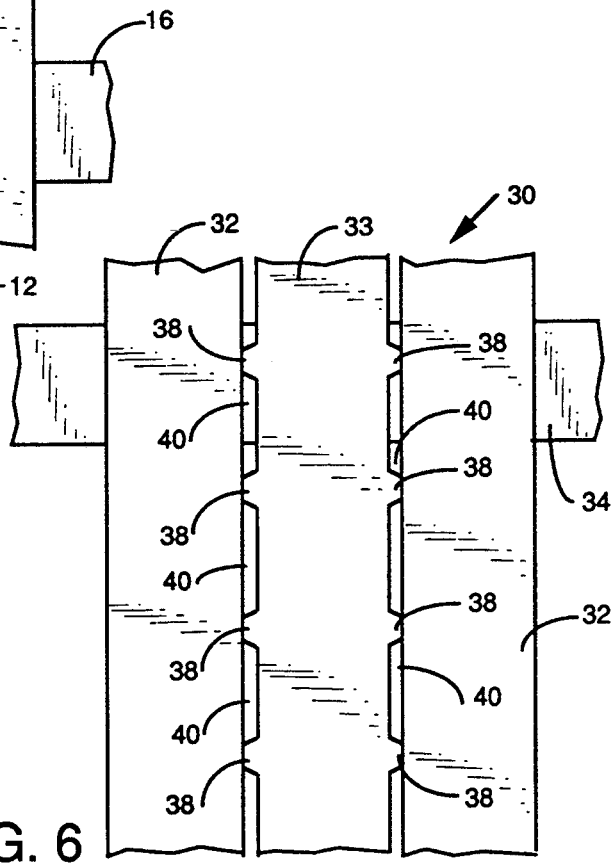
FIG. 6 is a partial plan view of the filter element of FIG. 5 showing the ridges of the rectangular filter wire member in engagement with the upper surface portions of both the adjacent trapezoidal filter wire members.

FIGS. 5 and 6 illustrate another embodiment of the filter element 30 of my invention. Trapezoidal shaped filter wire members 32 having sides of a smooth, continuous surface are secured as by spot welding, not shown, to a standard support element 34 with rectangular cross-sectioned shaped wire elements 33 secured to the same support element 34 in between pairs of the trapezoidal wire members 32. Each side surface of the rectangular wire members 33 are provided with identically sized and shaped, laterally extending, longitudinally spaced ridges 38. As with the earlier described embodiment of this invention, the ridges 38 are formed with a lateral dimension the same as that of the desired filter slit openings 40 formed between the filter wire members 32 and 33. The upper portions of the ridges 38 firmly engage the upper surface portions of the trapezoidal wire members 32. The ridges 38 of the rectangular wire members 33 in effect define the filter slit openings 40, and are capable of being formed at precise minute lateral dimensions such as between 0.5 and 100 microns.

In both embodiments described hereinabove, the heights of the filter wire elements are substantially the same whereby the surface defined by upper portions of the respective filler wire members is essentially continuous and smooth.

Figure 7:
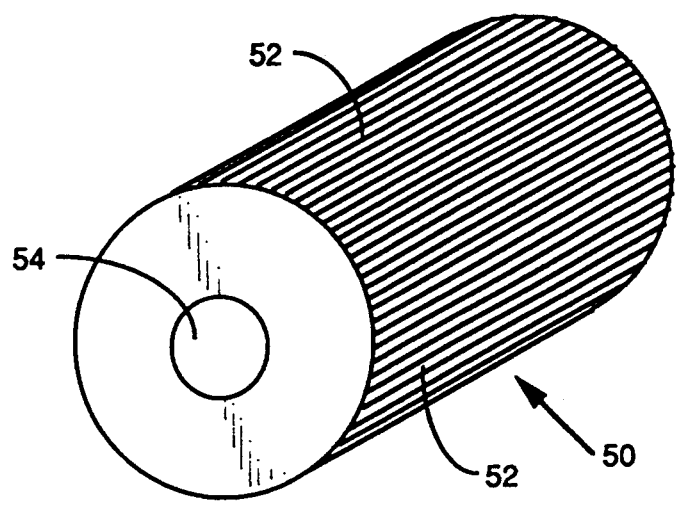
FIG. 7 is a diagrammatic representation in perspective of an embossing roller for use in forming the filter wire members forming part of this present invention.
Figure 8:
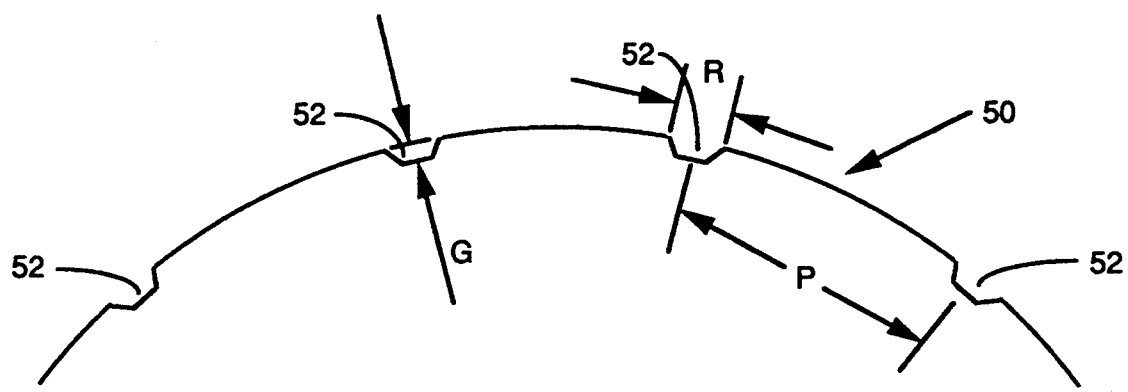
FIG. 8 is an exploded partial sectional view of one end of the embossing roller of FIG. 7.

The method of manufacture of the filter element 10 and 30 of the present invention would include the steps of forming the ridges 18 and 38 on the sides of the filter wire members 12 and 33, respectively, and securing the filter wire members to the support elements 16 and 36 to form the filter slit openings 20 and 40. FIGS. 7 and 8 illustrate diagrammatically a cylindrically shaped embossing roller 50 which would form the ridges 18 and 38 on the trapezoidal or rectangular filter wire members 12 and 33 The outer surface of the embossing roller 50 has formed thereon a series of precisely spaced and sized grooves 52 so as to impress the desired shaped and sized ridges 18 and 38 during the rolling operation. A precisely positioned concentric cylindrical shaft or bearing opening 54 is formed as required for support during the rolling operation. The exploded sectional view of FIG. 8 illustrates the general shape of the grooves 52, with a depth G, width R, and pitch or center to center distance P. The relative width of the grooves divided by the pitch R/P may be 0.05 to 0.9 but more desirably 0.05 to 0.15. The depth G is a function of the desired filter slit opening dimension or width, which approximates the size of the particle which is expected to pass through the filter element. When the final rolling is performed to create the ridges 18 on the trapezoidal filter wire members 12 and the grooves between the ridges, the full impression of the embossing roller 50 may be made when sufficient rolling pressure is exerted. The resultant ridges 18 on filter wire member 12 would have the height G from the roller 50 minus the elastic recovery of the metal. The need for consistently annealed wire to be fed to this final rolling operations would be required at this point.

For the alternate use of the rectangular filter wire member 33 it would be desirable to use two identical embossing rollers 50 so that both sides of the filter wire 33 could be formed simultaneously with forces therefore balanced and both sides receiving equal impressions.

Alternately when forming the final shape to filter wire members 12 and 33, any depth less than the maximum allowed by the roller groove depth G can be attained by reducing and controlling the rolling force or pressure exerted on the filter wire members 12 and 33. With this technique on design of embossing roller 50 may be used for a selected variety of finished filter slit opening dimensions or widths.

The quality of the surface finish and the durability of the embossing roller 50 determines the quality of the filter slit opening in the finished filter element made by the procedures just described. The roller 50 must necessarily be harder than the filter wire member to be shaped. A number of techniques and materials are available for this, including pressure molding of fritted and cemented particles, flame spraying some other hard materials, or extremely hard preformed tool steel. In any case fine grinding, lapping and polishing would be required to achieve the precision and finish needed to control the finished filter slit opening dimensions. The precision needed for production of a filter with 5 micron filter slit opening width is at least + or −0.5 to 2 microns and preferably 0.05 to 0.5, which is about equivalent to + or −0.000002 to 0.00002 inch. The finish or polished surface precision needed would be a fraction of this or about 0.5 to 5.0 RMS, or about 3 to 10 millions of an inch surface roughness. Other methods of shaping filter wire members 12 and 33 may be used, such as coining, etching, laser-burning, or other obvious techniques.

For smaller filter slit opening widths such as 0.1 to 5 microns, trapezoidal or other shaped wires may be used which by nature of irregularities in their width, particularly in their edges of the surfaces to be used as the filter surface, will touch only at random intervals, with small slit openings between. Such a filter element would not have the selectivity or capacity of a filter with all slits very nearly the same size, but its cost and ease of construction might justify its use in selected applications.

An alternate to the use of formed filter wire members with integral separation ridges involves the use of a removable coating or spacing material which may be used to achieve a controlled narrow filter slit opening width. A metallic or paint-like material may be applied to one side and just the upper part of that side of a shaped wire such filter as wire member 33 of FIGS. 5 and 6 that will touch the next filter wire member 32 at the filter surface at assembly. The applied material is then dried or treated so that it becomes hard and shrinks to the thickness desired for the filter slit opening of the finished filter element. Alternately, a metallic coating, such as aluminum, may be applied to a desired length such as spool-full of the formed wire element. This coating might be applied by electroplating or by vapor deposition, but in any case in precisely the thickness needed to achieve the desired filter slit opening width in the assembled and finished filter element. The assembly and welding occur with the applied material holding the wires apart the desired distance. Then the applied material is removed by dissolving, burning, reaction with an agent, or other method.

Alternately, trapezoidal-formed filter wire member 32 as in FIGS. 5 and 6 may be wound with the upper, filter surfaces touching at the edges during the welding operation. A precision fine-grinding or lapping operation is then used to remove enough of the widest part of the trapezoid so that a slit is exposed with the desired width. This grinding or lapping operation should be performed with the motion of the wheel or belt parallel to the axis of the wire to avoid "smearing" material into the tiny slit. Alternately the slit may be created using a laser, controlled etching of the entire surface of the assembled filter element, high-intensity ultrasound vibrations which would impact the edges of the filter wire members against each other, or related methods for metal working. The shaped filter wire member 12 and the support element 16 illustrated in FIGS. 1–4 must be strong enough to withstand the anticipated maximum pressure drop across the filter element. Thus the width and particularly the height of wire elements must be chosen by the designer for each application. The lower limits of these dimensions have been and will be limited by the physical limits of the machinery used to make and assemble them. The width of the filter slit openings in the finished filter element divided by the width of the shaped filter wire members determines the percent free or filtering area through which filtrate must pass, and thus the filter capacity. The percent filtering area is further reduced by the ridges 18 in FIGS. 1–4 which determine the filter slit opening width. These relationships may be summarized as follows, along with ranges of and preferred dimension, all in microns:

|  | WIRE | | GROOVE | RIDGE | | FILTRATION |
|---|---|---|---|---|---|---|
|  | Width | Height | Length | Width | Length | Area, % |
| Maximum | 3200 | 6400 | 2880 | 160 | 320 | 2.5 |
| Minimum | 100 | 200 | 90 | 0.2 | 10 | 0.19 |

Preferred examples:

| 800 | 800 | 720 | 20 | 80 | 2.25 |
|---|---|---|---|---|---|
| 400 | 800 | 180 | 5 | 20 | 1.12 |
| 400 | 400 | 18 | 0.5 | 2 | 0.18 |

It should be clearly recognized how the precise minute filter openings are achieved by my present invention to thereby provide that which has not heretofore been achieved, as was fully set forth in the introductory portion of this specifications. Those skilled in this art should recognize that my present invention will permit the retention of solids of fine sizes and at the same time achieve the filtering advantages of shaped wire filtering elements, with the attendant results indicated previously herein.

While I have shown and described certain present preferred embodiments of this invention and method of manufacturing the embodiments, it is to be distinctly understood that the inventions are not limited thereto, but may be otherwise embodied and practiced within the scope of the following claims.

I claim:

1. A filter element, including, in combination:
a plurality of generally parallel spaced elongated first filter wire member each having a generally trapezoidal cross-sectional shape, each of said first filter wire members defining an upper surface and a lower surface;

a plurality of generally parallel spaced elongated second filter wire members each having a generally rectangular cross-sectional shape and having on both side surfaces thereof a plurality of spaced ridges each of a pre-determined lateral dimension equivalent to a desired filtering slit opening, each of said second filter wire members defining an upper and lower surface, one each of said second filter wire members being arranged between each pair of said first filter wire members with said ridges being in engagement with at least the upper side surface of an adjacent first filter wire member; and support means engaging said first and second filter wire members for securing said first and second filter wire members in place.

2. The filter element as set forth in claim 1 wherein said lateral dimension of at least the upper portion of each of said ridges and each of said slit openings is between 0.5 and 100 microns.

3. The filter element as set forth in claim 1 where said ridges are integrally formed with said second filter wire members.

4. The filter element as set forth in claim 1 wherein said spaced ridges extend between said upper and lower surfaces of said second filter wire members.

5. The filter element as set forth in claim 1 wherein the heights of said first and second filter wire members are substantially equal whereby the secured in place first and second filter wire elements defines a substantially smooth upper surface.

6. The filter element as set forth in claim 1 wherein said ridges are selectively removable from said second filter wire members whereby after said first and second filter wire members are secured in place and said slit openings are defined said ridges may be removed leaving said slit openings as originally formed.

7. A method of manufacturing a filter element in which a plurality of generally elongated filter wire members are secured in place to define open slits between adjacent filter wire members, the slit openings having lateral dimensions between 0.5 and 100 microns, said method of manufacturing characterized by the steps of:

forming laterally extending ridges on both sides of a filter wire member having a generally rectangular cross-sectional shape, said ridges having a lateral dimension substantially the same as the desired openings of filtering slits between adjacent filter wire members;

securing one of said first filter wire members between a pair of second filter wire members each having a generally trapezoidal cross-sectional shape; and securing each of said first filter wire members and each pair of said second filter wire members in place such that the ridges of said first filter wire member engage at least the upper surface portions of the adjacent second filter wire members.

8. The method of manufacturing a filter element as set forth in claim 7 including the additional step of removing said ridges after said first filter wire members are secured in place whereby said filter slit openings remain as originally formed.

9. The method of manufacturing a filter element as set forth in claim 7 wherein said forming of said ridges is by coating said first filter wire members with a removable material.

10. The method of manufacturing a filter element as set forth in claim 7 wherein the material used in forming said ridges is more soluble than the material of said first filter wire members.

11. The method of manufacturing a filter element as set forth in claim 7 wherein said forming of said ridges is by coating said first filter wire members with a removable material; and including the step of treating said removable material to reach a thickness of a desired filter slit opening; and removing said ridges after said filter wire members are secured in place whereby said filter slit openings remain as originally formed.

* * * * *